(12) United States Patent
Mitchell, Jr.

(10) Patent No.: US 8,516,043 B2
(45) Date of Patent: *Aug. 20, 2013

(54) VIRTUAL LOCATION AWARE CONTENT USING PRESENCE INFORMATION DATA FORMATION WITH LOCATION OBJECT (PIDF-LO)

(75) Inventor: Donald Le Roy Mitchell, Jr., Bellevue, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/547,183

(22) Filed: Jul. 12, 2012

(65) Prior Publication Data
US 2012/0278438 A1 Nov. 1, 2012

Related U.S. Application Data

(63) Continuation of application No. 12/805,696, filed on Aug. 16, 2010, now Pat. No. 8,244,802, which is a continuation of application No. 11/651,051, filed on Jan. 9, 2007, now Pat. No. 7,805,483.

(60) Provisional application No. 60/766,289, filed on Jan. 9, 2006.

(51) Int. Cl.
*G06F 15/16* (2006.01)

(52) U.S. Cl.
USPC ............ 709/203; 709/202; 709/245; 709/246

(58) Field of Classification Search
USPC .................................. 709/202–203, 245–246
See application file for complete search history.

(56) References Cited

U.S. PATENT DOCUMENTS

| 4,625,081 A | 11/1986 | Lotito |
| 5,712,900 A | 1/1998 | Maupin |
| 5,937,344 A | 8/1999 | Zicker |
| 6,275,937 B1 | 8/2001 | Hailpern |
| 6,438,223 B1 | 8/2002 | Eskafi |
| 6,535,743 B1 | 3/2003 | Kennedy, III |

(Continued)

FOREIGN PATENT DOCUMENTS

| WO | WO/2004021726 | 3/2004 |
| WO | WO2007/025227 | 3/2007 |

OTHER PUBLICATIONS http://en.wikpedia.org/wiki/imsi, Wikipedia Encyclopedia, International Mobile Subscriber Identity, pp. 1-4, printed on Sep. 4, 2008.

(Continued)

*Primary Examiner* — Bharat N Barot
(74) *Attorney, Agent, or Firm* — William H. Bollman

(57) ABSTRACT

The format of the Presence Information Data Format-Location Object (PIDF-LO) as defined by the Internet Engineering Task Force (IETF) is extended or modified to accommodate, within the standard PIDF-LO format, an association of geospacial location to virtual content on the Internet. A filename of virtual content is associated with geospatial location information (either a specific location, zone, or direction). The filename is inserted into a <presence . . . > section of a Presence Information Data Format-Location Object (PIDF-LO) compliant document as defined by the Internet Engineering Task Force (IETF). In this way, geospacial location information is associated with Internet based virtual content using a standard PIDF-LO format.

21 Claims, 9 Drawing Sheets

(56) References Cited

U.S. PATENT DOCUMENTS

| | | | |
|---|---|---|---|
| 6,556,816 B1 | 4/2003 | Garfrick | |
| 6,675,017 B1 | 1/2004 | Zellner et al. | |
| 6,721,396 B2 | 4/2004 | Chin | |
| 6,865,266 B1 | 3/2005 | Pershan | |
| 6,925,504 B1 | 8/2005 | Liskov | |
| 7,031,724 B2 | 4/2006 | Ross | |
| 7,194,249 B2 | 3/2007 | Phillips | |
| 7,277,938 B2* | 10/2007 | Duimovich et al. | 709/203 |
| 7,526,563 B2* | 4/2009 | Ingimundarson et al. | 709/245 |
| 7,617,287 B2 | 11/2009 | Vella | |
| 7,627,331 B2* | 12/2009 | Winterbottom et al. | 455/456.1 |
| 7,684,782 B2 | 3/2010 | Ashly | |
| 7,805,483 B2* | 9/2010 | Mitchell | 709/203 |
| 7,822,391 B1 | 10/2010 | Delker | |
| 7,822,871 B2* | 10/2010 | Stolorz et al. | 709/202 |
| 7,895,263 B1 | 2/2011 | Kirchmeier | |
| 8,244,802 B2* | 8/2012 | Mitchell | 709/203 |
| 2002/0055924 A1 | 5/2002 | Liming | |
| 2002/0086659 A1 | 7/2002 | Lauper | |
| 2002/0099802 A1 | 7/2002 | Marsh | |
| 2002/0111159 A1 | 8/2002 | Faccin | |
| 2002/0113797 A1 | 8/2002 | Potter | |
| 2002/0136364 A1 | 9/2002 | Stumner | |
| 2002/0141386 A1 | 10/2002 | Minert | |
| 2002/0154221 A1 | 10/2002 | Ishimaru | |
| 2002/0174073 A1 | 11/2002 | Nordman | |
| 2003/0063714 A1 | 4/2003 | Stumer | |
| 2003/0063730 A1 | 4/2003 | Woodring | |
| 2003/0069002 A1 | 4/2003 | Hunter | |
| 2003/0081752 A1 | 5/2003 | Trandal | |
| 2003/0081754 A1 | 5/2003 | Esparza | |
| 2003/0115261 A1 | 6/2003 | Mohammed | |
| 2003/0125021 A1 | 7/2003 | Tell | |
| 2003/0135493 A1 | 7/2003 | Phelan | |
| 2003/0163483 A1 | 8/2003 | Zingher | |
| 2003/0186709 A1 | 10/2003 | Rhodes | |
| 2003/0187803 A1 | 10/2003 | Pitt | |
| 2003/0222901 A1 | 12/2003 | Houck | |
| 2004/0064500 A1 | 4/2004 | Kolar | |
| 2004/0093217 A1 | 5/2004 | Yeh | |
| 2004/0107143 A1 | 6/2004 | Niemi | |
| 2004/0150518 A1 | 8/2004 | Phillips | |
| 2004/0152493 A1 | 8/2004 | Phillips | |
| 2004/0156394 A1 | 8/2004 | Westman | |
| 2004/0157175 A1 | 8/2004 | Matsumoto | |
| 2004/0184584 A1 | 9/2004 | McCalmont | |
| 2004/0190497 A1 | 9/2004 | Knox | |
| 2004/0203568 A1 | 10/2004 | Kirtland | |
| 2004/0203919 A1 | 10/2004 | Ross | |
| 2004/0242191 A1 | 12/2004 | Hossain | |
| 2004/0247090 A1 | 12/2004 | Nurmela | |
| 2005/0003797 A1 | 1/2005 | Baldwin | |
| 2005/0030977 A1 | 2/2005 | Casey | |
| 2005/0031095 A1 | 2/2005 | Pietrowicz | |
| 2005/0039135 A1 | 2/2005 | Othmer | |
| 2005/0047399 A1 | 3/2005 | Lee | |
| 2005/0125021 A1 | 6/2005 | Nance | |
| 2005/0144322 A1 | 6/2005 | Miyajima | |
| 2005/0148353 A1 | 7/2005 | Hicks | |
| 2005/0181805 A1 | 8/2005 | Gallagher | |
| 2005/0186948 A1 | 8/2005 | Gallagher | |
| 2005/0188078 A1 | 8/2005 | Kotzin | |
| 2005/0190892 A1 | 9/2005 | Dawson | |
| 2005/0195954 A1 | 9/2005 | Klein | |
| 2005/0201358 A1 | 9/2005 | Nelson | |
| 2005/0202799 A1 | 9/2005 | Rollender | |
| 2005/0213537 A1 | 9/2005 | Ingimundarson | |
| 2005/0215233 A1 | 9/2005 | Perera | |
| 2005/0272424 A1 | 12/2005 | Gallagher | |
| 2005/0272449 A1 | 12/2005 | Gallagher | |
| 2005/0287979 A1 | 12/2005 | Rollender | |
| 2006/0044407 A1 | 3/2006 | Barbeau | |
| 2006/0073812 A1 | 4/2006 | Punaganti | |
| 2006/0079236 A1 | 4/2006 | Del Pino | |
| 2006/0099935 A1 | 5/2006 | Gallagher | |
| 2006/0135177 A1 | 6/2006 | Winterbottom | |
| 2006/0154665 A1 | 7/2006 | Svensson | |
| 2006/0184617 A1 | 8/2006 | Nicholas | |
| 2006/0189303 A1 | 8/2006 | Rollender | |
| 2006/0205383 A1 | 9/2006 | Rollender | |
| 2006/0206610 A1* | 9/2006 | Ling et al. | 709/203 |
| 2006/0236258 A1 | 10/2006 | Othmer | |
| 2007/0008885 A1 | 1/2007 | Bonner | |
| 2007/0027997 A1 | 2/2007 | Polk | |
| 2007/0104183 A1 | 5/2007 | Bakke | |
| 2007/0190968 A1 | 8/2007 | Dickinson | |
| 2007/0201623 A1 | 8/2007 | Hines | |
| 2007/0202844 A1 | 8/2007 | Wilson | |
| 2007/0218871 A1 | 9/2007 | Bonner | |
| 2007/0238448 A1 | 10/2007 | Gallagher | |
| 2008/0045250 A1 | 2/2008 | Hwang | |
| 2008/0080488 A1 | 4/2008 | Marsico | |
| 2008/0192731 A1 | 8/2008 | Dickinson | |
| 2008/0268809 A1 | 10/2008 | Busin | |
| 2009/0237210 A1 | 9/2009 | Ciesla | |
| 2010/0198933 A1 | 8/2010 | Smith | |
| 2010/0233991 A1 | 9/2010 | Crawford | |
| 2010/0262668 A1 | 10/2010 | Piett | |
| 2011/0207429 A1 | 8/2011 | Maier | |
| 2012/0079600 A1* | 3/2012 | Kellerman et al. | 709/246 |

OTHER PUBLICATIONS

Berners-Lee, et al., "Uniform Resource Identifier (URI) Generic Standard, Internet Engineering Task Force," Day Software, Jan. 1, 2005, pp. 1-61.

Linden, Greg, Geeking with Greg, Exploring the Future of Personalized Information, glinden.blogspot.com, pp. 1-2.

Winterbottom et al., Geopriv PIDF-LO Usage Clarification, Considerations and Recommendations, Geopriv, Feb. 12, 2005, pp. 1-19.

European Search Report in Appl. No. EP07 71 6216 dated Dec. 23, 2009.

Zehua et al., "On Querying Geospatial and Georeferenced Metadata Resources in G-Portal," IEEE Comp. Soc, May 31, 2003, pp. 245-255.

Peterson et al., "A Presence-Based GEOPRIV Location Object Format; rfc4119,txt," Neustar, Dec. 1, 2005, pp. 1-23.

Winterbottom, et al., "GEOPRIV PIDF-Lo Usage Clarification, Considerations and Recommendations; draft-ietf-geopriv-pdif-lo-profile-00.txt," Nortel, Jul. 2, 2005, pp. 1-31.

International Search Report received in PCT/US2012/067857 dated Feb. 20, 2013.

International Search Report received in PCT/US2012/67689 dated Feb. 22, 2013.

International Search Report received in PCT/US2012/066313 dated Feb. 4, 2013.

* cited by examiner

FIG. 4

Modified Presence Information Data Format - Location Object for use with MIME content

```
<?ml version="1.0" encoding="UTF-8"?>
    <presence xlmns="urn : ietf : params : xml : ns : pidf"
      xmlns : gp="urn : ietf : params : xml : ns : pidf : geopriv10"
      xmlns : gml="urn : opengis : specification : gml : schema-xsd : feature : v3.0"
      xmlns : cl="urn : ietf : params : xml : ns : pidf : geopriv10 : civilLoc"
      entity ="pres:http://otiswyres.com/images/SunfromPlane.png"
      name="weather:hurricane season, century : 1800, season : fall, year : 1842"
      src=http://otiswyres.com/images/SunFromPlane.png">
        <tuple id="sg89ab">
        <status>
           <gp : geopriv>
             <gp : location-info>
              <gml : position>
                <gml : Point gml : id="point96" srsName = "http://www.opengis.net/gml/srs/
epsg.xml#4326">
                   <gml : pos>31 : 56 : 00S 115 : 50 : 00E</gml : pos>
                 <gml : Point>
              </gml : position>
             </gp : location-info>
           </gp : geopriv>
        </status>
      <timestamp>2003-06-22T20 : 57 : 29Z< / timestamp>
      </tuple>
           <tuple id="sg89ae">
             <status>
              <gp : geopriv>
                 <gp : location-info>
```

⌐ — — — — — — CONTINUED ON SHEET 5/9 — — — — — — ⌐

FIG. 4

```
L.— — — — — — — CONTINUED FROM SHEET 4/9 — — — — — — — ┘
                        <cl : civilAddress>
                            <cl : country>US</cl : country>
                            <cl : A1>Florida</cl : A1>
                        <cl : A3>Miami</cl : A3>
                        <cl : A6>Ocean Blvd</cl : A6>
                        <cl : HNO>123</cl : HNO>
                        <cl : LOC>Suite 42</cl : LOC>
                        <cl : PC>55527-0401</cl : PC>
                        </cl : civilAddress>
                            </gp : location-info>
                    </gp : geopriv>
                </status>
            <timestamp>2003-06-22T20 : 57 : 29Z</ timestamp>
            </tuple>
    <Timeperiod>
    <begin>
        <TimeInstant>
        <timeposition>1876-08-01</ timePosition>
        </TimeInstant>
    </begin>
    <end>
        <TimeInstant>
            <timePosition>1876-08-02</ timePosition>
        </TimeInstant>
        </end>
    </TimePeriod>
</presence>
```

FIG. 5

Sample of one implementation for Location Aware Content -

Modified Presence Information Data Format - Location Object (PIDF-LO)

```
<presence entity=<img src"http://otiswyres.com/images/SunfromPlane.png" name="Sun from Plane">
    <note xml:lang="en">tag:weather="hurricane" tag:century="1800" tag:season="fall" tag:year="1842"</note>
    <tuple id="12345">
    <status>
        <geopriv>
            <location-info>
                <gml:location>
                    <gml:Point gml:id="point96" srsName="http://www.opengis.net/gml/srs/epsg.xml#4326>
                        <gml:coordinates>31:56:00S 115:50:00E</gml:coordinates>
                    </gml:Point>
                </gml:location>
            </gp:location-info>
                <cl:civilAddress>
                    <cl:country>US</cl:country>
                    <cl:A1>Florida</cl:A1>
                    <cl:A3>Miami</cl:A3>
                    <cl:A6>Ocean Blvd</cl:A6>
                    <cl:HNO>123</cl:HNO>
                    <cl:LOC>Suite 42</cl:LOC>
                    <cl:PC>55527-0401</cl:PC>
                </cl:civilAddress>
            </gp:location-info>
        </location-info>
    </geopriv>
    </status>
    </tuple>
</presence>
<TimePeriod>
    <begin>
        <TimeInstant>
            <timePosition>1876-08-01</timePosition>
        <TimeInstant>
    </begin>
    <end>
        <TimeInstant>
            <timePosition>1876-08-01</timePosition>
        </TimeInstant>
    </end>
</TimePeriod>
```

FIG. 6

An example of an Implementation of the XML required for Virtual Location Aware Content – Modified Presence Information Data Format – Location Object

```xml
<presence entity=&IIimg src"http://otiswyres.com/images/nelffiti/gunnar.gif" name="Gunnar">
    <note xml:lang="en">tag:virtual="nelffiti"</note>
    <tuple id="12345">
    <status>
        <geopriv>
            <location-info>
                <gml:location>
                    <gml:Point gml:id="point96" srsName="http://www.opengis.net/gml/srs/epsg.xml#4326>
                        <gml:coordinates>31:56:00S 115:50:00E</gml:coordinates>
                    </gml:Point>
                </gml:location>
            </gp:location-info>
                <cl:civilAddress>
                    <cl:country>US</cl:country>
                    <cl:A1>New York</cl:A1>
                    <cl:A3>New York</cl:A3>
                    <cl:A6>Wall Street</cl:A6>
                    <cl:HNO>123</cl:HNO>
                    <cl:PC>19227</cl:PC>
                </cl:civilAddress>
            </gp:location-info>
            </location-info>
        </geopriv>
    </status>
    </tuple>
</presence>
<TimePeriod>
    <begin>
        <TimeInstant>
            <timePosition>2005-09-01</timePosition>
        <TimeInstant>
    </begin>
    <end>
        <TimeInstant>
            <timePosition>2005-09-01</timePosition>
        </TimeInstant>
    </end>
</TimePeriod>
```

FIG. 8
(PRIOR ART)

```xml
<?xml version="1.0" encoding="UTF-8"?>
<presence xmlns="urn : ietf : params : xml : ns : pidf"
    xmlns : gp="urn : ietf : params : xml : ns : pidf : geopriv10"
    xmlns : cl ="urn : ietf : params : xml : ns : pidf : geopriv10 : civicAddr"
    xmlns : gs="urn : ietf : params : xml : ns : pidf : geopriv10 : geoShape"
    entity ="pres : mike@seattle.example.com">
    <tuple id="sg89ab">
      <status>
         <gp : geopriv>
            <gp : location-info>
                <Polygon srsName="urn : ogc : def : crs : EPSG : : 4326"
                         xmlns="http:// www.opengis.net/gml">
                   <exterior>
                      <LinearRing>
                         <pos>37.775 -122.4194</pos>
                         <pos>37.555 -122.4194</pos>
                         <pos>37.555 -122.4264</pos>
                         <pos>37.775 -122.4264</pos>
                         <pos>37.775 -122.4194</pos>
                      </LinearRing>
                   </exterior>
                </Polygon>
                <cl : civicAddress>
                   <cl : FLR>2</cl : FLR>
                </cl : civicAddress>
            </gp : location - info>
            <gp : usage - rules/>
         </gp : geopriv>
      </status>
      <timestamp>2003-06-22T20 : 57 : 29Z</timestamp>
   </tuple>
</presence>
```

VIRTUAL LOCATION AWARE CONTENT USING PRESENCE INFORMATION DATA FORMATION WITH LOCATION OBJECT (PIDF-LO)

The present application is a continuation of U.S. patent application Ser. No. 12/805,696, entitiled "Geospacial Location Associated with Content on a Network ", to Donald Le Roy Mitchell, Jr., filed on Aug. 16, 2010; which in turn is a continuation of U.S. patent application Ser. No. 11/651,051, entitled "Apparatus and Method for Associating a Geospacial Location to Content on a Network", to Donald Le Roy Mitchell, Jr., filed on Jan. 9, 2007, now U.S. Patent No. 7,805,483; which in turn claims priority from U.S. Provisional Application No. 60/766,289, entitled "Virtual Location Aware Content", to Donald Le Roy Mitchell, Jr., filed Jan. 9, 2006, the entirety of all three of which are expressly incorporated herein by reference.

BACKGROUND OF THE INVENTION

1. Field of the Invention

This invention relates generally to wireless and long distance carriers, Internet Service Providers (ISPs), and information content delivery services/providers and long distance carriers. More particularly, it relates to location services for the wireless industry.

2. Background of Related Art

Location information regarding subscribers is becoming increasingly available in a wireless network. Location information relates to absolute coordinates of a wireless device.

FIG. 7 shows a conventional LoCation Services (LCS) request.

In particular, as shown in FIG. 7, a location server 106 requests location information regarding a particular mobile subscriber (MS) from a core network node, e.g., from a Mobile Switch Center (MSC) 110. Requested information regarding a particular wireless device (MS) may include, e.g., attach, detach, and location area update. The location server 106 may also request information regarding the wireless device such as attach, detach and/or location area update from a Packet Data Node (e.g., SGSN, GGSN, or PDSN), or help the device calculate x/y direction. Typically, location information regarding a particular wireless device is requested of a home location register (HLR).

As shown in step 1 of FIG. 7, a locations services client 104 sends a message to a location server 106.

In step 2, the location server 106 sends a Provide Subscriber Info message to a Home Location Register 108, requesting subscriber information regarding a particular subscriber.

In step 3, the carrier's Home Location Register (HLR) 108 provides the subscriber information for the requested subscriber back to the location server 106.

In step 4, location information regarding the requested subscriber is requested to either an MSC or Packet Data node 110. The MSC or Packet Data Node preferably provides precise location information using, e.g., a global positioning satellite (GPS), triangulation techniques, or other relevant locating technology, or helps the device calculate X/Y direction.

In step 5, the location request is forwarded to the Radio Access Network (RAN) 112 if needed.

In step 6, precise, updated location information regarding the requested subscriber is sent to the location server (LS) 106.

In step 7, an ultimate response to the original location request is sent to the LCS client 104 that initially requested the location information.

Secure User Plane for Location (SUPL) is a standards-based protocol that has been developed to allow a mobile handset client to communicate with a location server, e.g., as shown in step 1 of FIG. 7. The SUPL specification is defined by the Open Mobile Alliance (OMA) standards working group. Refer to OMA Secure User Plane Location Architecture document, OMA-AD-SUPL-V1_0-20060127-C for more details on OMA SUPL call flows; and OMA User Plane Location Protocol document, OMA-TS-ULP-V1_0-20060127-C. The OMA SUPL Version 1 specifies two basic types call flows: (1) a SUPL network initiated (NI) call flow, and (2) a SUPL set initiated (SI) call flow. According to the SUPL standard, a session ID has a unique value consisting of server and handset portions.

The conventional Presence Information Data Format-Location Object (PIDF-LO) was developed by the GEOPRIV working group, and is the Internet Engineering Task Force (IETF) recommended way to encode location information. Location information in PIDF-LO format may be implemented in a variety of ways, including in presence based systems, and in the context of emergency services and other location based routing applications.

The PIDF-LO format provides for an unbounded number of tuples. (A "tuple" generally relates to a group of anonymous data values traveling together. The word is a generalization of the sequence: couple, triple, quadruple, quintuple, sextuple, etc.)

The geopriv element resides inside the status component of a tuple, hence a single PIDF document may contain an arbitrary number of location objects, some or all of which may be contradictory or complementary. The actual location information is contained inside a <location-info> element, and there may be one or more actual locations described inside the <location-info> element.

Generally speaking, the structure of a PIDF-LO can be depicted as follows:

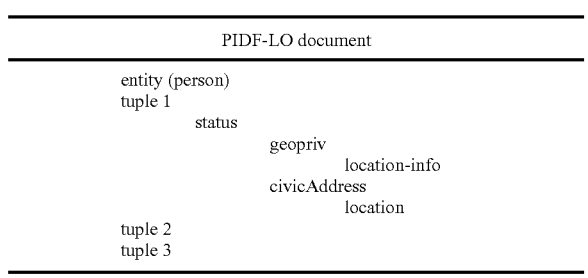

The conventional PIDF-LO format provides information relating to location, time and status to individuals and entities. The PIDF-LO structure is intended for use with standardized Internet protocols, including Internet protocol (IP), Session Initiation Protocol (SIP), and Simple Object Access Protocol (SOAP).

For multi-media communications using Session Initiation Protocol (SIP), the location of a caller can be indicated in PIDF-LO format. SIP is an Internet Engineering Task Force (IETF) standard protocol for initiating an interactive user session that involves multimedia elements such as video, voice, chat, gaming, virtual reality, etc. SIP is specified in IETF Request for Comments (RFC) 3261 (replacing 2543). Like HTTP or SMTP, SIP works in the application layer of the open systems interconnection (OSI) communications model.

SIP can also be used to invite participants to sessions that do not necessarily involve the initiator. Because SIP supports name mapping and redirection services, it makes it possible for users to initiate and receive communications and services from any location, and for networks to identify the users wherever they are. SIP is a request-response protocol dealing with requests from clients and responses from servers. Participants are identified by SIP universal resource locators (URLs). Requests can be sent through any transport protocol, such as UDP, SCTP, or TCP. SIP determines the end system to be used for the session, the communication media and media partners, and the called party's desire to engage in the communication. Once these are assured, SIP establishes call parameters at either end of the communication, and handles call transfer and termination.

FIG. 8 shows a conventional Presence Information Data Format-Location Object (PDIF-LO) format document, as defined by the Internet Engineering Task Force (IETF).

In particular, FIG. 8 shows an example of civic and geospatial location information use in conventional PIDF-LO format document. In the given example, an entity named Mike is visiting his Seattle office and connects his laptop into an Ethernet port in a spare cube. In this case the location is a geodetic location, with the altitude represented as a building floor number. The main location of user is inside the rectangle bounded by the geodetic coordinates specified. Further that the user is on the second floor of the building located at these coordinates.

Of particular note in FIG. 8 is that the entity list is conventionally used to identify a physical entity:

entity="pres:mike@seattle.example.com"

Generally speaking, conventional PIDF-LO presence lists are used to identify a person. An example person entity=Don@telecomsys.com and a corresponding example name=is "Don Mitchell".

SUMMARY OF THE INVENTION

A method and apparatus for tying a geospacial location to virtual content on a network comprises identifying a filename to be tagged with geospacial location information. The filename of the virtual content is inserted into a <presence ...> section of a Presence Information Data Format-Location Object (PIDF-LO) compliant document as defined by the Internet Engineering Task Force (IETF). Geospacial location information is thus associated with virtual content.

BRIEF DESCRIPTION OF THE DRAWINGS

Features and advantages of the present invention will become apparent to those skilled in the art from the following description with reference to the drawings, in which:

FIG. 4 shows exemplary presence lists for a Modified Presence Information Data Format-Location Object (Modified PIDF-LO) document for use in tying MIME type logical content to a geospacial location, and for tagging the content with descriptive information relating to the content, in accordance with another embodiment.

FIG. 5 shows exemplary presence lists for a location aware content-Modified Presence Information Data Format-Location Object (Modified PIDF-LO) for use in tying MIME type logical content to a geospacial location, and for tagging the content with descriptive information relating to the content, in accordance with yet another embodiment.

FIG. 6 shows an embodiment of the invention comprising virtual use of location aware content to associate graffiti, chat room messages, blogs, etc., with a particular location, with an exemplary presence list for a Modified Presence Information Data Format-Location Object (Modified PIDF-LO) for use in tying MIME type virtual content to a geospacial location, and for tagging the location with graphical and/or descriptive information relating to the location, in accordance with the principles of the present invention.

FIG. 8 shows a conventional Presence Information Data Format-Location Object (PDIF-LO) format document, as defined by the Internet Engineering Task Force (IETF).

DETAILED DESCRIPTION OF ILLUSTRATIVE EMBODIMENTS

Figure 1:
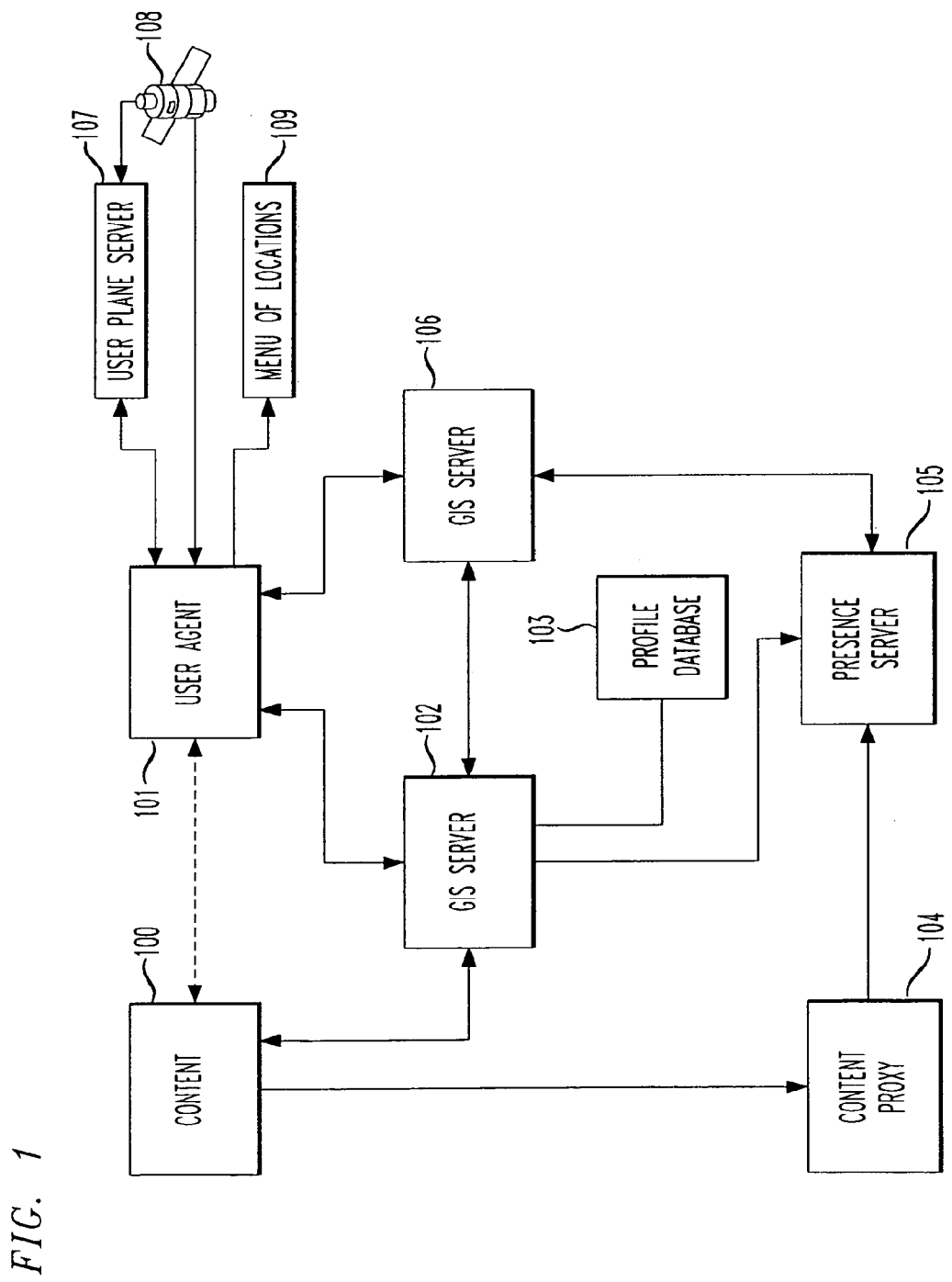
FIG. 1 shows relevant elements associating MIME type content on the Internet to a geographic location while also correlating other descriptive indexing terms within a modified standards based Extensible Markup Language (XML) based PIDF-LO structure as defined by the Internet Engineering Task Force (IETF), for use with standardized Internet protocols such as IP, SIP and SOAP, in accordance with one embodiment.

The present invention extends and modifies the otherwise conventional format of the Presence Information Data Format-Location Object (PIDF-LO) format as defined by the Internet Engineering Task Force (IETF). Conventional PIDF-LO document format tags actual people or places with a geospacial location. The otherwise conventional PIDF-LO format is extended or modified to associate a geospacial location to virtual data (e.g., to form graffiti, or Netfitti as referred to herein) on a computer network such as the Internet, corporate Intranets, and/or corporate Extranets.

In particular, a given location or location zone is associated with graffiti type graphics and/or comments or blogging (referred to as "Netfitti" herein). Thus, instead of associating with a person, the invention associates location with content, e.g., Internet XML content.

In accordance with the disclosed embodiments, content is referenced using a location aware content modification to the otherwise conventional PIDF-LO format as follows. A location is associated with Internet based XML reference content using a modified PIDF-LO format using the otherwise conventional <presence ...> section lists elements. Elements used include the "entity", "src" and/or "name" fields are modified to associate a location with Internet based XML content.

As an example, the "entity=" element of the PIDF-LO format may be referenced as, e.g., entity="pres:http://ow.com/S.png".

Similarly, the "name=" element may be referenced as, e.g., name="weather: hurricane season, century:1800, season:fall, year:1842".

The "src=" element may be referenced as, e.g., http://ow.com/s.png.

Individuals and entities are referenced in the conventional PIDF-LO format by a universal resource indicator (URI), e.g., "pres:mike@samplecarrier.com". As modified herein to associate location to Internet based content, words are included within the content to indicate an active reference to the relevant content subject. These words may be inserted, e.g., in the <meta name "keywords"> section of an HTML document.

Location may be associated to Internet based XML content using an XML based structure either (a) using Simple Object Access Protocol (SOAP); or (b) using Session Initiation Protocol (SIP).

Exemplary specific location aware ("Location") content tags include, e.g., a specific location identified by latitude and longitude (lat/lon); or a specifically defined zone.

A location zone may be defined, e.g., using a coordinate based polygon system. A suitable coordinate based polygon is disclosed and described in co-owned and co-pending U.S. patent application Ser. No. 11/442,254, filed May 30, 2006, entitled "Voice Over Internet Protocol (VoIP) E911 Metro Street Address Guide (MSAG) Validation"; which claims priority from 60/685,075, filed May 27, 2005, entitled "Voice Over Internet Protocol (VoIP) E911 Metro Street Address Guide (MSAG) Challenges", by Timothy J. Lorello, the entirety of both of which are expressly incorporated herein by reference.

A coordinate based polygon system defining location zone may have an assigned numbering system. For example, the assigned number "1.0.0.0" may be used to indicate a four (4) square kilometer (Km) area with an assigned centroid lat/lon; the assigned number "1.1.0.0" may be used to indicate a two (2) square Km area with an assigned centroid lat/lon; the assigned number "1.1.1.0" may be used to indicate a one (1) square Km area with an assigned centroid lat/lon; and the assigned number "1.1.1.1" may be used to indicate a one-half (0.5) square Km area with an assigned centroid lat/lon.

Location may be defined directionally, e.g., as "north", "south", "east", "west", etc.

In another embodiment, XML content (e.g., photos on the Internet) can be provided with descriptive information using location aware content tags included in the presence information of a PIDF-LO document. Exemplary location aware content tags include, e.g., "Time Reference", "Weather Reference", and/or "Descriptive Reference" tags.

Regarding various content types, several protocols allow the use of data representing different 'media' such as text, images, audio, and video, and within such media different encoding styles, such as (in video) JPEG, GIF, IEF, and TIFF. The Multimedia Internet Message Extensions (MIME) protocol defines several initial types of multimedia data objects, and a procedure for registering additional types with the Internet Assigned Numbers Authority (IANA): text, images, audio and video.

FIG. 1 shows relevant elements associating MIME type content on the Internet to a geographic location while also correlating other descriptive indexing terms within a modified standards based XML based PIDF-LO structure as defined by the Internet Engineering Task Force (IETF), for use with standardized Internet protocols such as IP, SIP and SOAP, in accordance with one embodiment.

In particular, FIG. 1 shows elements in a given network relevant to associating location to XML content in an Internet network. Content 100 on a relevant network server is associated with location by network elements, including a user agent 101, an application server 102, a content proxy 104, a presence server 105, a profile database 103, a geographic information server (GIS) server 106, a user plane server 107, a global positioning satellite (GPS) 108, and a menu of locations 109.

Figure 2:
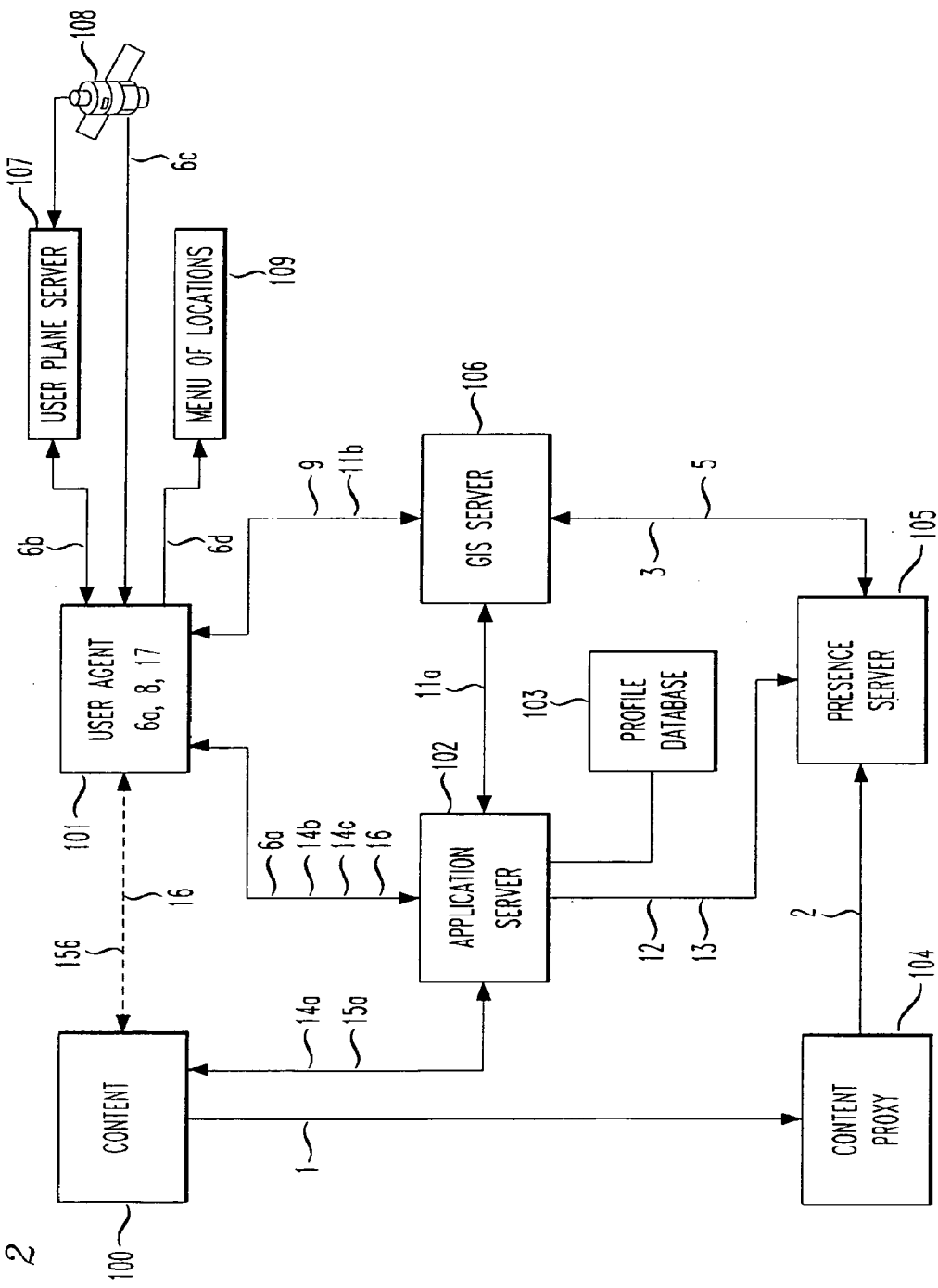
FIGS. 2 and 3 show message flow between the relevant elements associating MIME type content on the Internet to a geographic location, as shown in FIG. 1.
Figure 3:
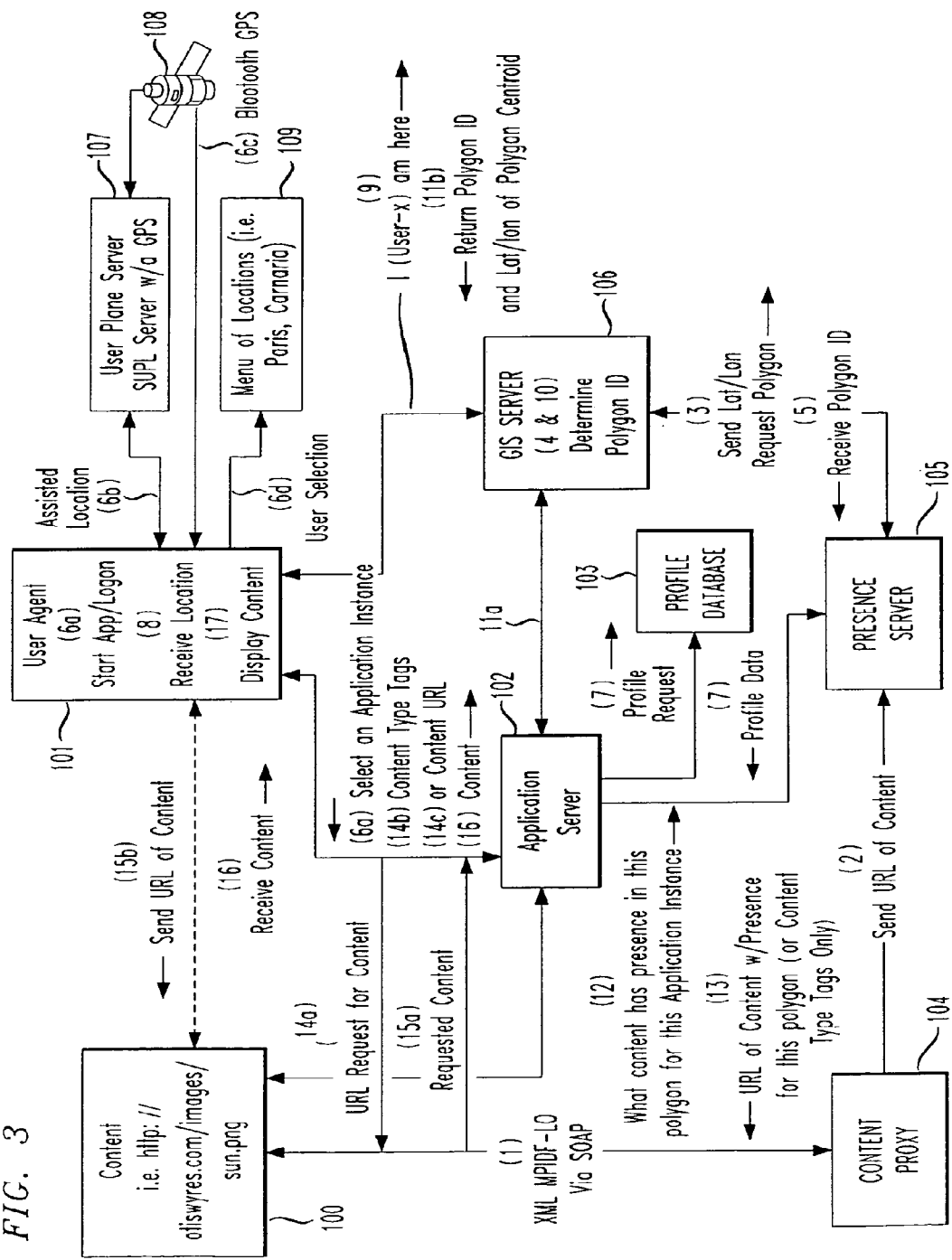
Figure 7:
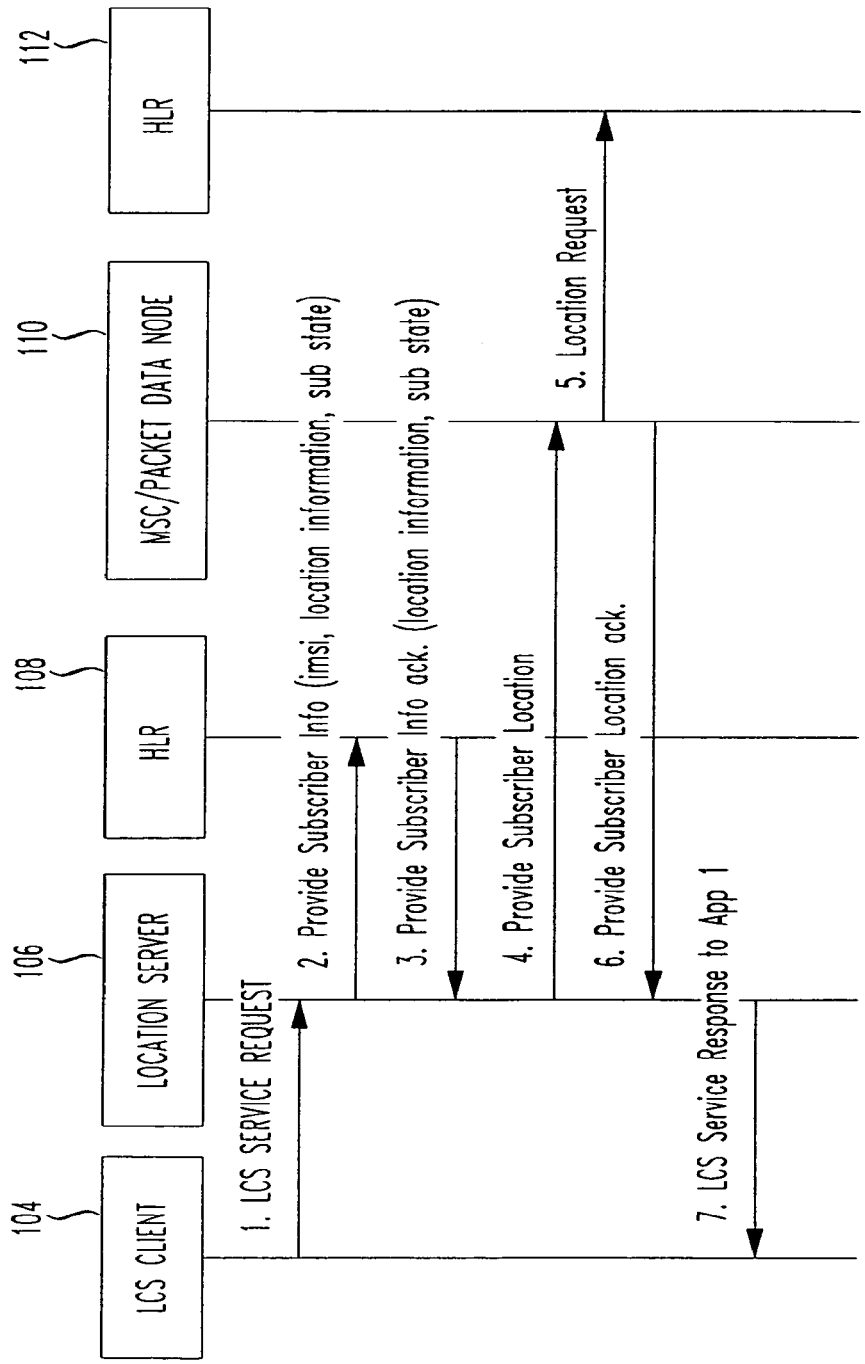
FIG. 7 shows a conventional LoCation Services (LCS) request.

FIGS. 2 and 3 show message flow between the relevant elements associating MIME type content on the Internet to a geographic location, as shown in FIG. 1.

In particular, in step 1 of FIGS. 2 and 3, content 100 is sent to the content proxy 104 using an XML/SOAP interface. The content 100 may be, for the sake of example, http://otiswyres. com/images/sun.png". The transaction uses an XML based Modified Presence Information Data Format-Location Object (MPIDF-LO) as described herein.

In step 2, the content proxy 104 passes the universal resource locator (URL) of the content 100 to the presence server 105. The presence server 105 establishes a record of the content 100 and all associated tags.

In step 3, the presence server 105 sends a lat/lon or polygon "Request" to the GIS server 106. The lat/lon relates to a location of the content 100.

In step 4, the GIS server 106 determines the polygon ID associated with the provided lat/lon of the content 100.

In step 5, the GIS server 106 returns back the determined polygon ID.

In step 6a, the user starts up a main application on the user agent 101, selects an instance to run, and (as shown in steps 6b-6d) the Location type, and passes relevant logon information to the application server 102.

In step 6b, the assisted global positioning system "aGPS" and a user plane server 107 (e.g., a SUPL server with aGPS) in a carrier network provide location. Alternatively, as shown in step 6c, a BLUETOOTH™ GPS 108 may provide location. Another alternative, shown in step 6d, allows the user to select a location from a menu of locations, e.g., "Paris", "Camaria", etc. 109.

In step 7, the application server 102 looks up the user profile for the application instance, and completes the logon process. Profile data is passed from the profile database 103 back to the application server 102.

In step 8, the user agent 6a receives location from the source (step 6b, 6c or 6d).

In step 9, the user agent 101 sends its location to the GIS server 106, e.g., "user 'X' indicates that 'I am here'".

In step 10, the GIS server 106 identifies the polygon within which the user agent 101 is currently located.

In step 11a, the GIS server 106 passes the identified polygon ID to the application server 102, e.g., "user 'X' is in this polygon at this absolute position".

In step 11b, the GIS server 106 returns the identified polygon ID and lat/lon of the polygon centroid to the user agent to the application on the user agent 101.

In step 12, the application server 102 requests identification of what content has presence in the identified polygon for this application instance. For example, a list of content with presence in this polygon may be provided, for this application instance, and within the relevant user profile.

In step 13, the presence server 105 returns to the application server 102 a list of content (or content tags) relevant to the user profile, this application instance, and this polygon ID, e.g., the URL of content with presence for this polygon [or content type tags only].

In step 14a, the application server 102 uses the URL for each element in the list of content and sends a URL request (e.g., hyper-text transfer protocol (HTTP)) to the relevant content 100. Or, as shown in step 14b, the application server 102 requests content type tags from the user agent 101. Or, as shown in step 14c, the application server 102 requests from the user agent 101 the identity or URL of content.

In step 15a, the requested content is returned to the application server 102, or the content URL from step 14c is relayed from the application.

In step 15b, the user agent 101 requests the content for each element, e.g., via Hyper Text Transfer Protocol (HTTP) and the URL of requested content.

In step 16, the content is returned to the application on the user agent 101 directly from the content source 100, or from the application server 102.

In step 17, the application on the user agent 101 displays or otherwise utilizes the received content.

FIG. 4 shows exemplary presence lists for a Modified Presence Information Data Format-Location Object (Modified PIDF-LO) document for use in tying MIME type logical content to a geospacial location, and for tagging the content with descriptive information relating to the content, in accordance with another embodiment.

In particular, as shown in FIG. 4, an otherwise conventional PIDF-LO format is modified to use the "entity=", "name=", and "src=" lists in the presence section of a modified PIDF-LO format to identify XML content. In this particular example, the XML content is identified as:

```
entity="pres:http://otiswyres.com/images/SunfromPlane.png"
src=http://otiswyres.com/images/SunfromPlane.png"
``` and within the first tuple is:

```
srsName="http://www.opengis.net/gml/srs/epsg.
    xml#4326
```

Note also in FIG. 4 the addition of descriptive tags to XML content. Predefined tags in this example are "weather", "century", "season" and "year".

```
name="weather:hurricane season, century: 1800, sea-
    son: fall, year: 1842"
```

Thus, the location aware content defined by the "entity=" list in the presence section of the MPIDF-LO document is further modified with a description of hurricane season, 1800 century, fall season, and 1842.

FIG. 5 shows exemplary presence lists for a location aware content-Modified Presence Information Data Format-Location Object (Modified PIDF-LO) for use in tying MIME type logical content to a geospacial location, and for tagging the content with descriptive information relating to the content, in accordance with yet another embodiment.

In particular, as shown in FIG. 5, an otherwise conventional PIDF-LO format is modified to use the "entity=", "name=", and "src=" lists in the presence section of a modified PIDF-LO format to identify XML content. In this particular example, the XML content is identified as:

```
entity=<img
src=http://otiswyres.com/images/SunfromPlane.png
name="Sun from Plane"
``` and within the first tuple is:

```
srsName="http://www.opengis.net/gml/srs/epsg.
    xml#4326"
```

Note also in FIG. 5 the addition of descriptive tags to XML content. As in the example of FIG. 4, Predefined tags in the example of FIG. 5 are "weather", "century", "season" and "year".

```
tag:weather="hurricane"
tag:century="1800"
tag:season="fall"
tag:year="1842"
```

Thus, the location aware content defined by the "entity=" list in the presence section of the MPIDF-LO document is further modified with a description of hurricane, 1800 century, fall season, and 1842.

FIG. 6 shows an embodiment of the invention comprising virtual use of location aware content to associate graffiti, chat room messages, blogs, etc., with a particular location.

In particular, the embodiment discloses an exemplary presence list for a Modified Presence Information Data Format-Location Object (Modified PIDF-LO) for use in tying MIME type virtual content to a geospacial location, and for tagging the location with graphical and/or descriptive information relating to the location, in accordance with the principles of the present invention.

In particular, as shown in FIG. 6, Location Aware Content refers to content that is (or was) geographically present at some point in time. In accordance with this aspect, the term Virtual Location Aware Content refers to content that is created to overlay geographically present content.

For instance, an application can associate overlay images onto a geographic location. Netfitti is a grafitti like image that uses descriptive reference tags (e.g., "virtual=", and a geographic location representation (i.e., lat/lon). Virtual location aware content allows a graffiti graphics file, and then geo-tagging that electronic image to a specific location (lat/lon).

Thus, the present invention associates virtual content with a location, i.e., associates virtual content to location, e.g., to display buildings within a 'real' location. In this way, virtual content such as a graffiti image can be displayed on the side of the building (as if it was there in actuality).

The distinction between using PIDF-LO to associate a web page with a location as described in the earlier embodiments, and using PIDF-LO to associate virtual content with a location, is best explained by a general comparison of FIG. 6 (Virtual Location Aware Content as in this embodiment) to FIG. 5 (Location Aware Content).

In particular, as seen in FIG. 5, the "entity=" parameter was filled with a web page on the Internet. In that example, that web page was associated with a given location. In FIG. 6, the "entity=" parameter is filled with an image to be overlayed on content associated with the location, as directed by the tag: virtual="netffiti". Thus, to indicate that virtual content is to be associated with a location, the "entity=" parameter is used to indicate a graffiti file, e.g., "netfitti1.png".

While the invention has been described with reference to the exemplary embodiments thereof, those skilled in the art will be able to make various modifications to the described embodiments of the invention without departing from the true spirit and scope of the invention.

What is claimed is:

1. A method of associating a geospacial location to content on a network, comprising:
   identifying, at a physical network server, geospacial location information;
   identifying, at said physical network server, an Extensible Markup Language (XML) content identifier identifying XML content;
   associating, at said physical network server, geospacial location information with said XML content via said XML content identifier; and
   formulating, at said physical network server, Presence Information Data Format-Location Object (PIDF-LO) data including said geospacial location information associated with said XML content via said XML content identifier.

2. The method of associating a geospacial location to content on a network according to claim 1, wherein:
a filename of said XML content identifier is inserted in an "entity=" list in a <presence . . . > section of said modified PIDF-LO data.

3. The method of associating a geospacial location to content on a network according to claim 2, wherein:
a filename of said XML content identifier is inserted in a "src=" list in a <presence . . . > section of said modified PIDF-LO data.

4. The method of associating a geospacial location to content on a network according to claim 1, wherein:
a filename of said XML content identifier is inserted in a "src=" list in a <presence . . . > section of said modified PIDF-LO data.

5. The method of associating a geospacial location to content on a network according to claim 1, wherein:
said filename of said XML content identifier is inserted in a "name=" list in said <presence . . . > section of said modified PIDF-LO compliant data.

6. The method of associating a geospacial location to content on a network according to claim 1, wherein:
said geospacial location information identifies a specific zone.

7. The method of associating a geospacial location to content on a network according to claim 6, wherein:
said specific zone is defined using a coordinate based polygon system.

8. The method of associating a geospacial location to content on a network according to claim 7, wherein:
said coordinate based polygon system is defined using an assigned numbering system.

9. The method of associating a geospacial location to content on a network according to claim 1, wherein:
said geospacial location information identifies a specific latitude/longitude.

10. The method of associating a geospacial location to content on a network according to claim 1, wherein:
said geospacial location information is defined directionally.

11. The method of associating a geospacial location to content on a network according to claim 1, wherein:
said network is an Internet.

12. The method of associating a geospacial location to content on a network according to claim 1, wherein:
said network is a corporate Intranet.

13. The method of associating a geospacial location to content on a network according to claim 1, wherein:
said network is a corporate Extranet.

14. The method of associating a geospacial location to content on a network according to claim 1, wherein:
said XML content comprises text.

15. The method of associating a geospacial location to content on a network according to claim 1, wherein:
said XML content comprises at least one image.

16. The method of associating a geospacial location to content on a network according to claim 1, wherein:
said XML content comprises audio.

17. The method of associating a geospacial location to content on a network according to claim 1, wherein:
said XML content comprises video.

18. The method of associating a geospacial location to content on a network according to claim 1, wherein:
said XML content is Multimedia Internet Message Extensions (MIME) type content.

19. The method of associating a geospacial location to content on a network according to claim 1, further comprising:
tagging descriptive information relating to said XML content identifier in a <presence . . . > section of said modified PIDF-LO data.

20. The method of associating a geospacial location to content on a network according to claim 19, wherein:
said tagged descriptive information is included in a <presence . . . > section of said modified PIDF-LO data.

21. The method of associating a geospacial location to content on a network according to claim 19, wherein:
said tagged descriptive information includes a "virtual=" tag.

* * * * *